(12) United States Patent
Radke et al.

(10) Patent No.: US 7,192,034 B2
(45) Date of Patent: Mar. 20, 2007

(54) LOAD BASED SUSPENSION MOTION LIMITING

(75) Inventors: Daniel Dean Radke, Dubuque, IA (US); James Arthur Nagorcka, Tarrington Victoria (AU); Lyal Douglas Allen, Hamilton Victoria (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/286,732

(22) Filed: Nov. 23, 2005

(65) Prior Publication Data

US 2006/0113095 A1 Jun. 1, 2006

Related U.S. Application Data

(60) Provisional application No. 60/631,558, filed on Nov. 29, 2004.

(51) Int. Cl.
*B60G 17/00* (2006.01)

(52) U.S. Cl. .......................... 280/6.159; 280/124.106; 280/124.161; 280/400

(58) Field of Classification Search ............. 280/6.154, 280/6.159, 6.16, 124.106, 124.107, 124.159, 280/124.16, 124.161, 400; 180/89.12; 296/190.07
See application file for complete search history.

(56) References Cited

U.S. PATENT DOCUMENTS

| 3,328,019 | A | * | 6/1967 | Wilson ........................ 267/186 |
| 3,763,938 | A | | 10/1973 | Brodersen ................... 172/789 |
| 3,899,028 | A | | 8/1975 | Morris et al. ................ 172/4.5 |
| 3,907,041 | A | | 9/1975 | Manor ........................ 172/780 |
| 3,974,699 | A | | 8/1976 | Morris et al. ................. 73/432 |
| 3,986,563 | A | | 10/1976 | Stubben ....................... 172/793 |
| 4,053,017 | A | | 10/1977 | Gill et al. ..................... 172/4.5 |
| 4,061,194 | A | | 12/1977 | McCanse ..................... 172/447 |
| 4,088,236 | A | | 5/1978 | Moore .......................... 214/90 |
| 4,124,080 | A | | 11/1978 | McCanse ..................... 172/447 |
| 4,213,507 | A | | 7/1980 | Horrer et al. ................ 172/784 |
| 4,340,126 | A | | 7/1982 | Larson ........................ 180/305 |
| 4,635,730 | A | | 1/1987 | Larsson ....................... 172/788 |
| 4,696,350 | A | | 9/1987 | Ruhter et al. ................ 172/793 |
| 4,807,461 | A | | 2/1989 | Brimeyer et al. ............ 172/793 |
| 5,074,061 | A | | 12/1991 | Thompson ..................... 37/129 |
| 5,180,028 | A | * | 1/1993 | Perrenoud, Jr. ............. 180/235 |
| 5,549,412 | A | | 8/1996 | Malone ...................... 404/84.1 |
| 5,762,446 | A | | 6/1998 | Manatt et al. ................ 404/75 |
| 5,775,438 | A | | 7/1998 | Confoey et al. ............ 172/831 |
| 5,794,966 | A | * | 8/1998 | MacLeod .................. 280/5.507 |
| 5,921,706 | A | | 7/1999 | Manatt et al. ................ 404/72 |
| 6,322,287 | B1 | | 11/2001 | Yelton ......................... 404/118 |
| 6,382,873 | B1 | | 5/2002 | Mulders et al. ............. 404/128 |
| 6,691,795 | B2 | | 2/2004 | L'Abbe ....................... 172/787 |
| 2002/0162669 | A1 | | 11/2002 | L'abbe ....................... 172/787 |

* cited by examiner

*Primary Examiner*—Paul N. Dickson
*Assistant Examiner*—Robert A. Coker

(57) ABSTRACT

An articulated loader has an articulated chassis and two A-frames. The points of the A-frames face each other. The articulated chassis includes a front portion and a rear portion. Likewise, there is a front or first A-frame and a rear or second A-frame. The A-frames are connected to the overall chassis at points close to but offset from the point of vehicle articulation via ball joints and via hydraulic suspension cylinders toward the wider portions of the "A"s. The vehicle is propelled along the ground by independently driven tracks. The invention includes a feature to limit the motion of the suspension system based on the load applied to the suspension cylinders, i.e., the pressure experienced by the head end of the suspension cylinders. This is accomplished via pilot operated check valves.

4 Claims, 5 Drawing Sheets

LOAD BASED SUSPENSION MOTION LIMITING

This document claims priority based on U.S. provisional; application Ser. No. 60/631,558, filed Nov. 29, 2004, and entitled LOAD BASED SUSPENSION MOTION LIMITING, under 35 U.S.C. 119(e).

FIELD OF THE INVENTION

This applies to an articulated crawler dozer with an independent suspension system.

BACKGROUND OF THE INVENTION conventional construction vehicles (dozers, loaders, backhoes, skid steers, graders, etc) do not usually have cushioning suspension systems but are, at most, equipped with pneumatic tires. The consequence is that the machine ride can be very harsh dependant upon the operating conditions of the machine. Presented herein is an articulated dozer with an independent suspension system that reduces the harshness of the ride.

Agricultural tractors are increasingly incorporating suspension systems to reduce the shock to the vehicle and increase the operational speed of the vehicle.

Traditionally, blade equipped machines such as crawlers or graders are structurally rigid. Such rigidity is desirable to prevent vertical motion in response to changing soil conditions. The cutting edge is typically angled back at the top so that it will shave off material when elevated material is contacted. A consequence of this characteristic is that a vertical force is generated on the blade cutting edge when hard soil conditions are encountered. If the machine is not sufficiently rigid, the blade will lower and dig into the ground under these conditions. When soft soil is encountered and the vertical force reduced, the blade will tend to rise to a higher elevation. An analogy can be made to a plane that is used in woodworking. The tool shaves off high regions without gouging, and moves over low regions without any affect to the material. Thus, the addition of suspension to a machine such as this creates a situation that is counter to the desired conditions stated above. The suspension may allow the blade to move up or down based on the load encountered from the contours of the ground.

SUMMARY OF THE INVENTION

An exemplary articulated vehicle using the invention includes a front lower A-frame and a rear lower A-frame as well as an articulated chassis having a front portion and a rear portion. The front and rear A-frames are pivotally attached to the articulated chassis via ball joints, the point of attachment for the front lower frame being forward of the chassis articulation joint and the point of attachment for the rear lower frame being rearward of the chassis articulation joint. Relative lateral movement between the lower A-frames and the portions of the articulated chassis to which they are attached are constrained due to pan hard rod connections between the A-frames and the articulated chassis at each end of the articulated chassis. Toward each end of the chassis two front suspension cylinders and two rear suspension cylinders situated between the front chassis potion and the front A-frame and between the rear chassis portion and the rear A-frame, respectively, support the articulated chassis above the A-frames allowing relative vertical movements between the A-frames and the chassis.

In order to control vehicle roll, the head end of the right front suspension cylinder is hydraulically connected to the rod end of the left front suspension cylinder and the head end of the left front suspension cylinder is hydraulically connected to the rod end of the right front suspension cylinder. This arrangement reduces the effective cylinder area to the rod area of the cylinder and creates a higher pressure in the system which is desirous for improved suspension control.

Due to the structural requirements of the invention, the A-frames and track systems may comprise a significant portion of the vehicle weight. When an upward force is applied, the suspension system can allow the chassis to move upward and away from the track system until the suspension system reaches equilibrium or the end of travel for the suspension cylinders. This travel produces a looseness in the suspension and does not allow a full blade load to be generated when desired.

Naturally, such a suspension system will tend to allow variations in the height of the blade above the ground as the blade encounters greater and lesser resistance resulting in varying vertical loads on the blade and the suspended chassis of the vehicle. The suspension height of the chassis will tend to vary with the vertical load generated causing undesirable results with respect to blade control.

The head end pressure for each of the hydraulic suspension cylinders is determined by the load on that cylinder divided by the rod area of that cylinder in the system described. This pressure is also exerted on at least one of a control valve and an accumulator.

When a force on the cylinder is removed, the pressure drops to approximately zero. If the lifting force continues to exist, the cylinder can continue to extend by allowing the oil that is in the rod of one cylinder to flow to the head of the other cylinder. This is an undesirable condition.

The invention overcomes this problem by adding a standard pilot operated check valve to the rod end port of each cylinder. The pilot end of each check valve is connected to the head end of each corresponding cylinder. When the suspension is operating in a normal (weight bearing) condition, the pressure on the head end of the cylinder holds the check valve in an open position and the suspension operates normally with no affect from this valve. When the weight on the cylinder is eliminated, the pressure in the head end of the cylinder is reduced to approximately zero. In this condition the check valve closes and the oil is trapped in the rod end of the cylinder. This enables the suspension to carry loads in the opposite direction, and eliminates the free travel mentioned earlier. When the suspension load returns to the normal (weight bearing) condition, the check valve opens and the suspension resumes normal operation.

BRIEF DESCRIPTION OF THE DRAWINGS

Embodiments of the invention will be described in detail, with references to the following figures, wherein.

DESCRIPTION OF THE ILLUSTRATED EMBODIMENT

The exemplary embodiment of the invention described herein is applied to a crawler dozer with four independent track systems. In this configuration, the track systems are mounted such that they can move in a way that they can follow the contour of the ground. Each of the tracks pivots about a drive wheel.

Figure 1:
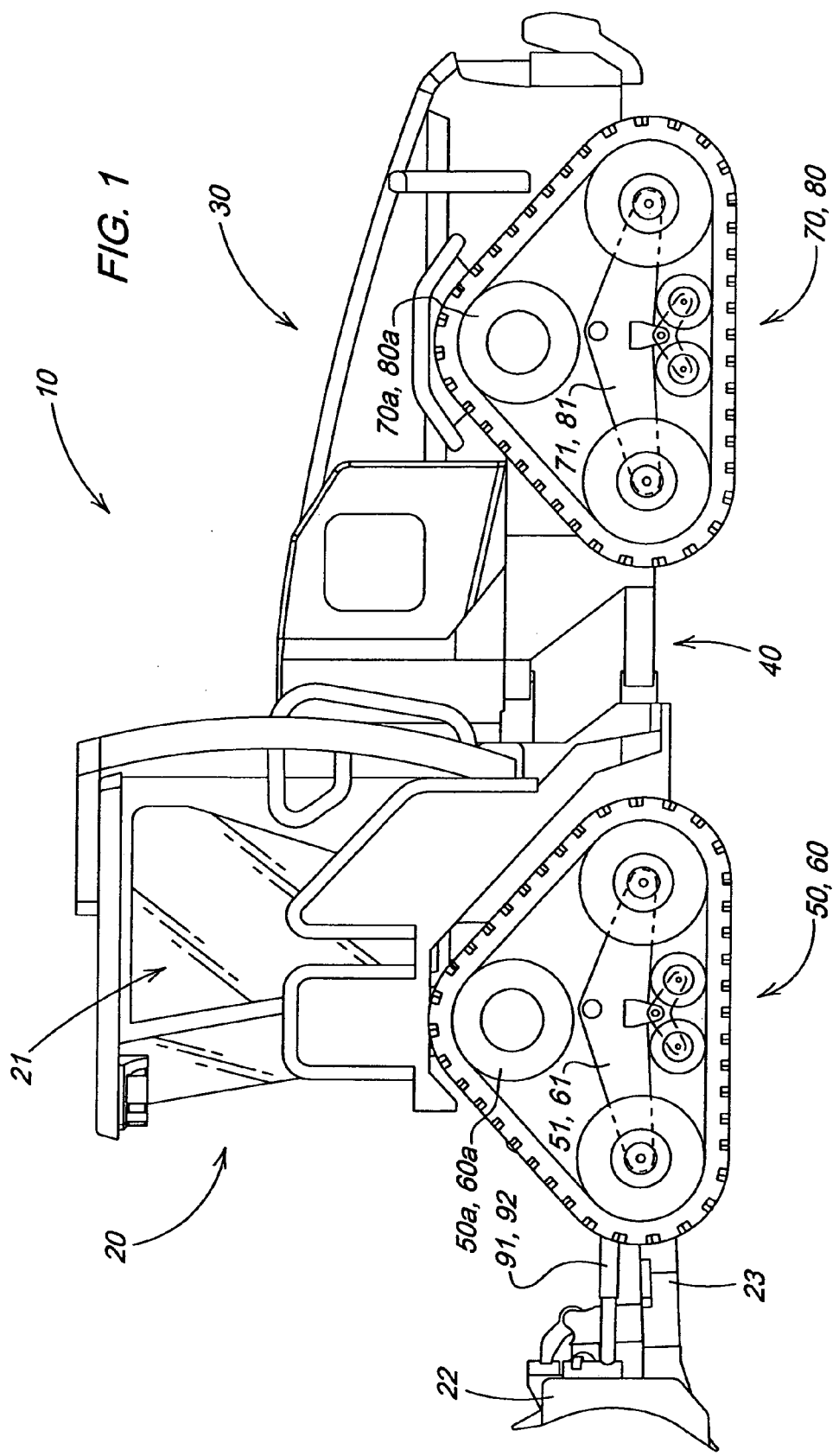
FIG. 1 is a side view of a work vehicle in which the invention may be used.

FIG. 1 illustrates a vehicle in which the invention may be used. The particular vehicle illustrated in FIG. 1 is a four track articulated dozer 10 having a front portion 20 a rear portion 30; an articulation mechanism 40 between the front portion 20 and the rear portion 30; first and second track systems 50, 60; and third and fourth track systems 70, 80. The front portion 20 includes a blade 22 and a blade mounting frame 23 as well as an operator cab 21.

Figure 3:
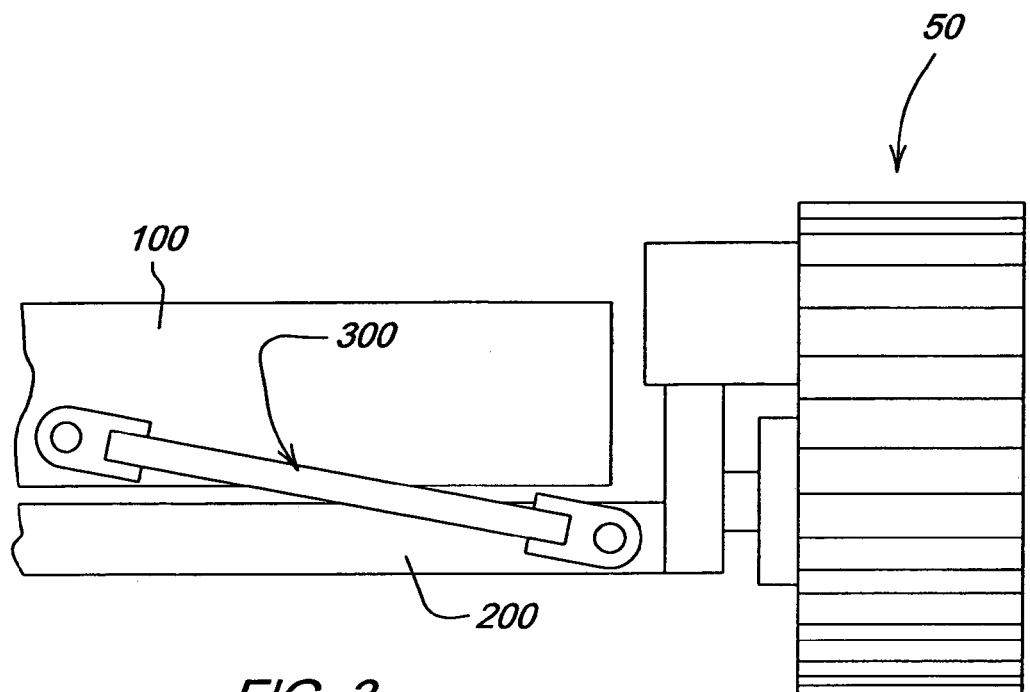
FIG. 3 is a front view of a front portion of the chassis and a first A-frame connected by a pan hard rod.
Figure 4:
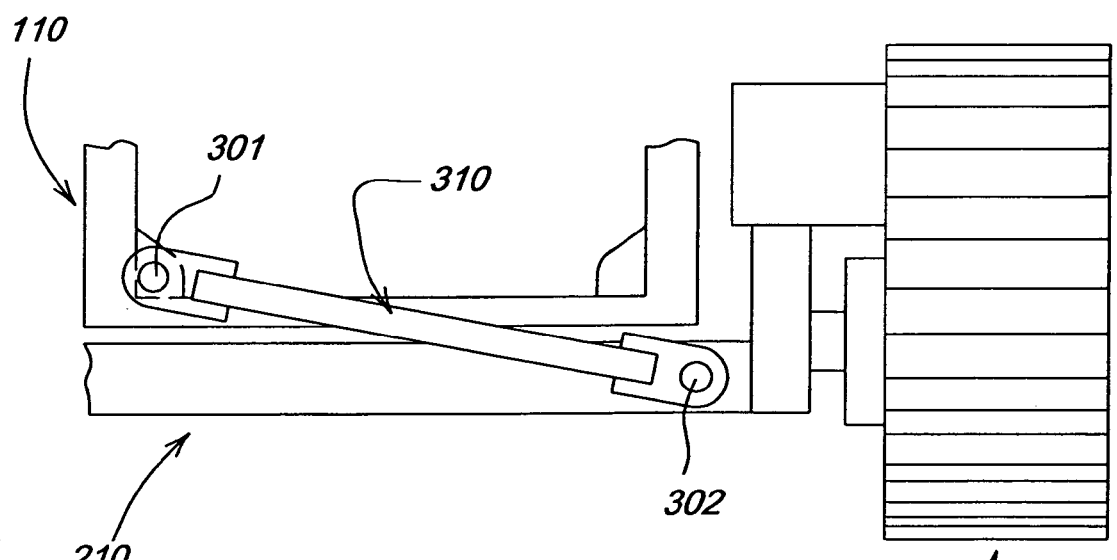
FIG. 4 is a rear view of a rear portion of the chassis and a second A-frame connected by a pan hard rod.
Figure 5:
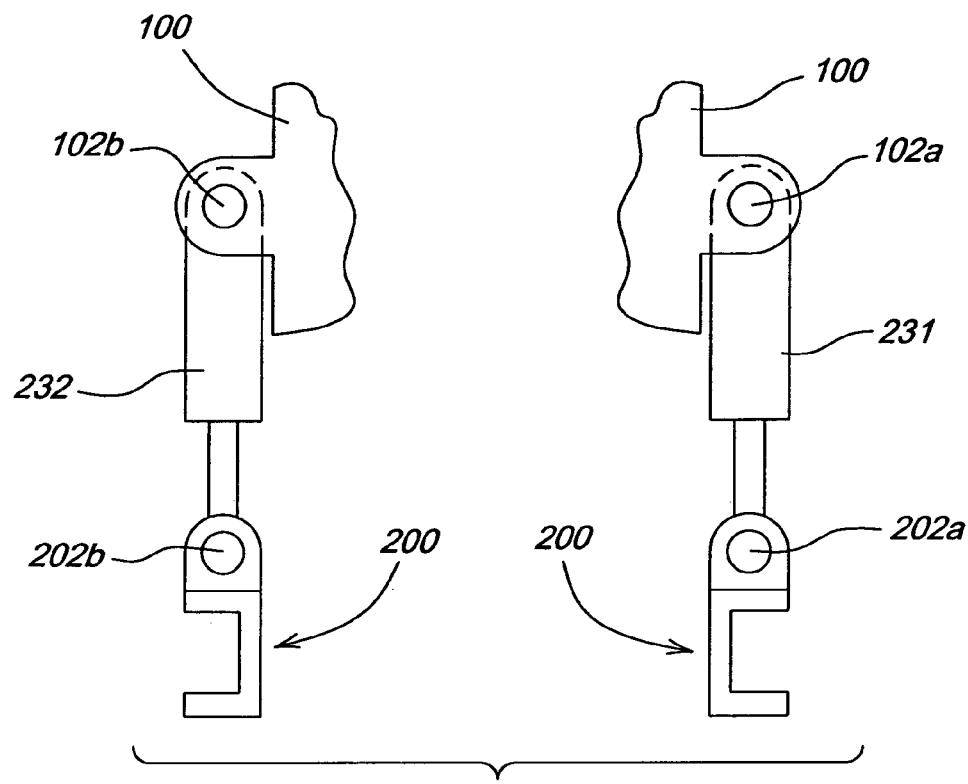
FIG. 5 is a front view of the front portion of the chassis and the first A-frame connected by two suspension cylinders.

A first A-frame 200 is pivotally connected to both the first and second track systems 50, 60, i.e., rocker arms 51, 61 at first and second track frame pivots 51a, 61a. This first A-frame 200 is connected to a front chassis portion 100 primarily at the top of the "A", i.e., at a narrower portion of the first A-frame 200, with a first spherical ball joint 101. This first spherical ball joint 101 is located in proximity to but forward of the articulation joint 40. Laterally the first A-frame 200 is connected to the vehicle frame with a first linkage (first pan-hard rod) 300 (see FIG. 3) to keep the position of the first A-frame approximately centered under the front chassis portion 101, restricting relative lateral motion. The front chassis portion 100 is vertically connected to the first A-frame 200 by a first suspension cylinder 231 having a first cylinder head end 231a and a first cylinder rod end 231b; and a second suspension cylinder 232 having a second cylinder head end 232a and a second cylinder rod end 232b. Each of the first and second suspension cylinders 213, 232 is, respectively, connected, hydraulically, to hydraulic accumulators 251, 252. A mechanism senses the position of the first A-frame 200 relative to the front chassis portion 100 at each cylinder location, and controls the vehicle height, via hydraulic balancing circuit 240, by adding or removing hydraulic fluid to and from the first and second suspension cylinders 231, 232 on a continuous basis. These cylinders primarily support the vehicle weight.

It is also desired to control vehicle roll position at this front axle 203. To accomplish this, the first cylinder head end 231a is hydraulically connected to the second cylinder rod end 232b. Conversely the second cylinder head end 232a is hydraulically connected to first cylinder the rod end 231b of the first cylinder 231. This methodology reduces the effective cylinder area to be equal to the rod area of the cylinder. This creates a higher pressure in the system which is desirous for improved suspension control.

The first and second suspension cylinders 231, 232 are attached to the first A-frame 200 at respective points behind the first and second track frame pivots 51a, 61a so that they operate at an increased pressure level. This helps contribute to the roll stability mentioned above by increasing the pressure proportionally. However, when a force on the cylinders 231, 232 is removed, the pressure drops to approximately zero and if a lifting force continues to exist, the cylinders 231, 232 can continue to extend by allowing the oil in the rod ends 231b, 232b to flow to the head ends 232a, 231a respectively, a condition of instability. This instability is overcome by adding standard pilot operated check valves 231c, 232c at the rod ends 231b, 232b of the suspension cylinders 231, 232 respectively. The pilot lines of check valves 231c, 232c are connected to the head ends 231a, 232a of the suspension cylinders 231, 232 respectively.

Figure 2:
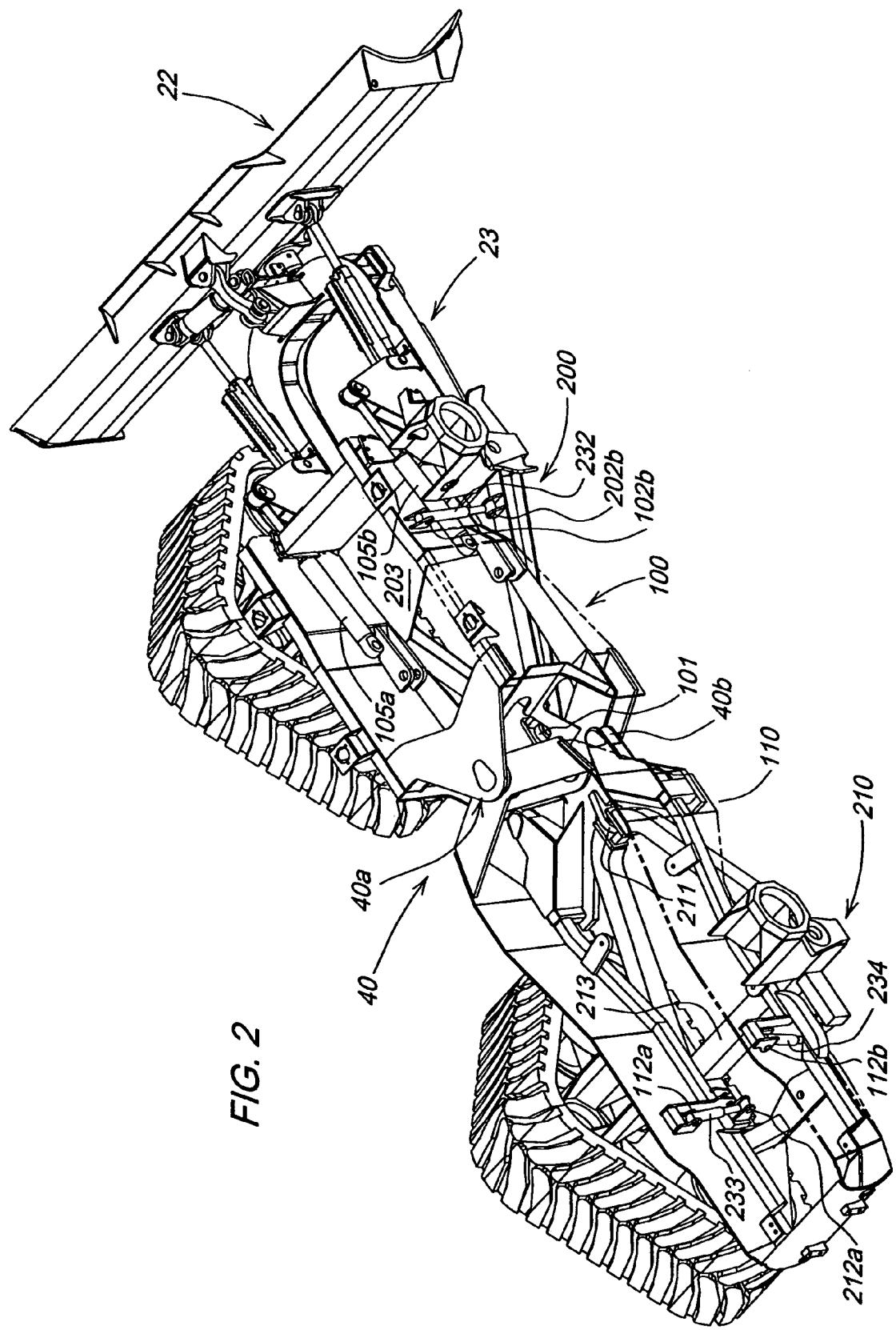
FIG. 2 is an elevated oblique view of an articulated chassis, two A-frames and C-frame of the vehicle illustrated in FIG. 1.

A second A-frame structure 210 is pivotally connected to both the third and fourth track systems 70, 80, via rocker arms 71, 81, through third and fourth track frame pivots 71a, 81a. As illustrated in FIG. 2, the second A-frame 210 is connected to a rear chassis portion 210 primarily at the top of the "A", i.e., at a narrower portion of the second A-frame 210, via a spherical ball joint 211. This connection point is located in proximity to but rearward of the articulation joint 40. Laterally the second A-frame 210 is connected to the rear chassis portion 110 with a linkage (pan-hard rod) 310 to the second A-frame 210 approximately centered under the rear chassis portion 110. The rear chassis portion 110 is vertically connected to the second A-frame 210 by a third suspension cylinder 233 having a third cylinder head end 233a and a third cylinder rod end 233b; and a fourth suspension cylinder 234 having a fourth cylinder head end 234a and a fourth cylinder rod end 234b. These suspension cylinders 233, 234 are hydraulically connected together and are, respectively, flow connected to hydraulic accumulators 253, 254. A mechanism senses the position of the second A-frame 210 relative to the second chassis portion 110 at a point midway between the third and fourth suspension cylinders 233, 234 indicating the average location, and controls the vehicle height, via hydraulic balancing circuit 241, by adding or removing hydraulic fluid from the third and fourth suspension cylinders 233, 234 on a continuous basis.

Figure 7:
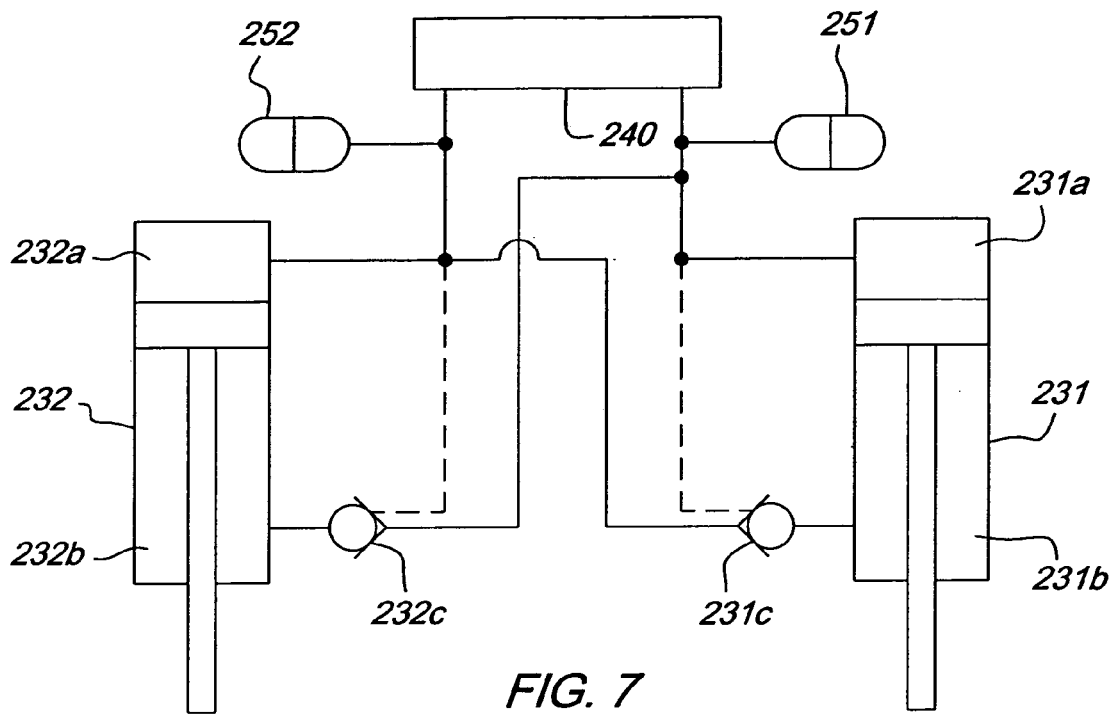
FIG. 7 is an exemplary schematic of the cylinders illustrated in FIG. 5.
Figure 8:
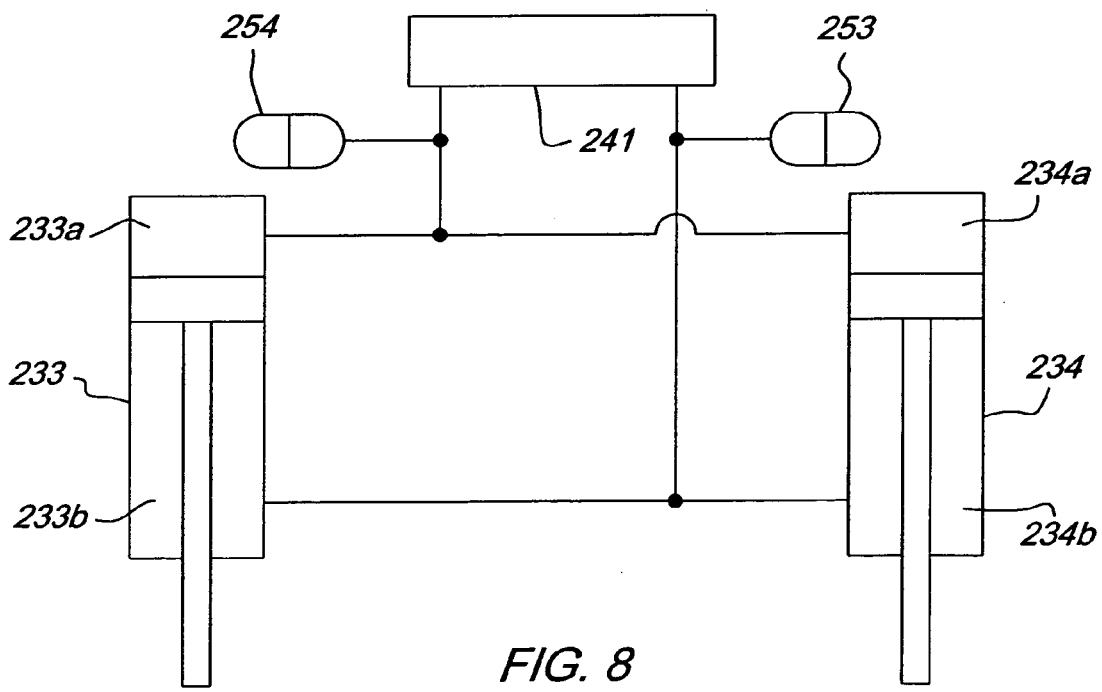
FIG. 8 is an exemplary schematic of the cylinders illustrated in FIG. 6.

It is desired to have the rear axle oscillate to ensure all 4 tracks maintain ground contact at all times. This is done by connecting the third and fourth head ends 233a, 234a of the third and fourth cylinders 233, 234 together to allow oil to flow from one to the other as needed. The third and fourth rod ends 233b, 234b of the third and fourth cylinders 233, 234 are also connected together likewise. Thus, the third and fourth cylinder head ends 233a, 234a are hydraulically connected and the third and fourth cylinder rod ends 233b, 234b are hydraulically connected (see FIG. 7).

First and second balancing circuits 240, 241 are hydraulic circuits that maintain the nominal distances between the front chassis portion 100 and the front A-frame 200 and the rear chassis portion 110 and the rear A-frame 210. A load sense line directs a hydraulic pump to provide fluid at an appropriate pressure to maintain the distances.

Figure 6:
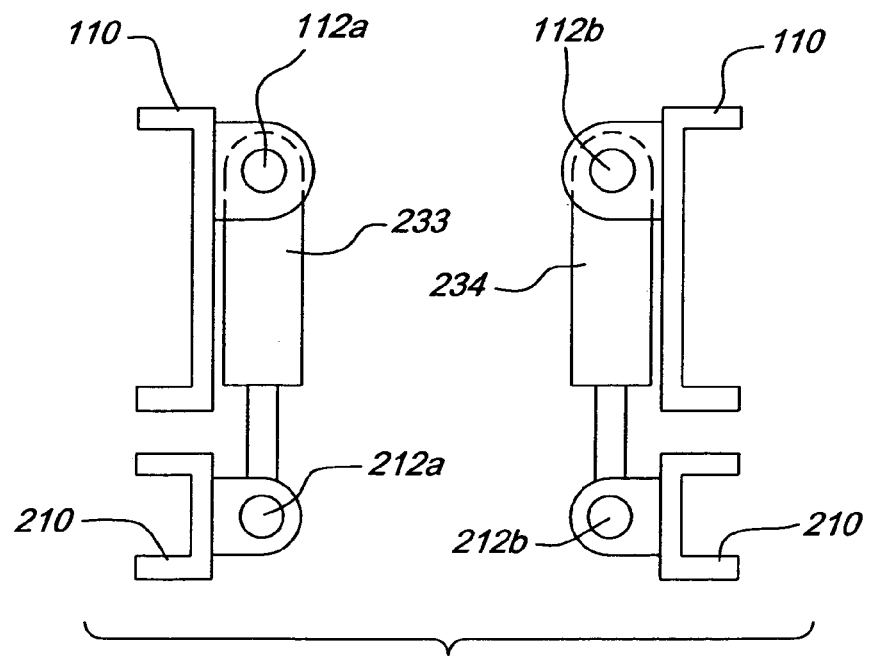
FIG. 6 is a rear view of a rear portion of the chassis and a second A-frame connected by two suspension cylinders.

The third and fourth cylinders 233, 234 are attached to the second A-frame 210 at a point behind the track frames, i.e., rocker arm pivots 71, 81 so that they operate at a reduced pressure level. This lowers the pressure of the system for a smoother ride. In the exemplary embodiment illustrated in FIGS. 2 and 6, the third hydraulic suspension cylinder 233 is connected to the rear chassis 110 at pivot 112a and to the second A-frame 210 at pivot 212a. Similarly, the fourth hydraulic suspension cylinder 234 is connected to the rear chassis 110 and the second A-frame at pivots 112b and 212b respectively. This lowers the pressure of the system for a smoother ride.

The blade mounting structure, referred to as the C-frame 23, is operatively attached to the first A-frame 200. This ensures the blade level (right to left with respect to the operator) will be consistent with the tracks and not affected by vehicle chassis motion enabled by the suspension system motion.

The front suspension operates, in part, as follows. When the suspension is operating in a normal (weight bearing) condition, the pressures on the head ends $231a$, $232a$ of the front suspension cylinders $231$, $232$ holds the check valves $231c$, $232c$ in open positions allowing fluid to flow between the rod ends $231b$, $232b$ and the head ends $232a$ and $231a$ respectively. When forces on the cylinders $231$, $232$ are removed, the pressures at the head ends $231a$, $232a$ of the suspension cylinders $231$, $232$ reduce to approximately zero psi, the pressure communicated to the pilot operated check valves $231c$, $232c$. In this condition the check valves $231c$, $232c$ close and hydraulic fluid is trapped in the rod end of the cylinder, enabling the suspension to carry loads in the opposite direction and eliminating free travel.

Having described the illustrated embodiment, it will become apparent that various modifications can be made without departing from the scope of the invention as defined in the accompanying claims.

The invention claimed is:

1. An articulated dozer, comprising:
   a front chassis portion;
   a rear chassis portion connected to the front chassis portion via an articulation joint;
   a first A-frame;
   a second A-frame, a length of the second A-frame frame being approximately equal to a length of the first A-frame frame, the front chassis portion and the rear chassis portion, respectively suspended above the first and second A-frames;
   a first suspension cylinder having a first cylinder head end and a first cylinder rod end, the first suspension cylinder operatively attached to the front chassis portion and the first A-frame;
   a second suspension cylinder having a second cylinder head end and a second cylinder rod end, the second suspension cylinder operatively attached to the front chassis portion and the first A-frame;
   a first pilot operated check valve having a first check valve pilot line, the first check valve connected to the rod end of the first suspension cylinder, the first check valve pilot line connected to the second cylinder head end; and
   a second pilot operated check valve having a second check valve pilot line, the second check valve connected to the rod end of the second suspension cylinder, the second check valve pilot line connected to the first cylinder head end.

2. The articulated dozer of claim 1, wherein the first and second pilot operated check valves open when pressure is applied to the first and second check valve pilot lines and close when the pressure approaches zero psi.

3. The articulated dozer of claim 2 further comprising a blade operatively attached to the first A-frame, wherein the pressure is applied by an application of a downward load on the blade.

4. The articulated dozer of claim 3, wherein the pressure approaches zero as the downward load on the blade is removed.

* * * * *